Patented Feb. 5, 1952

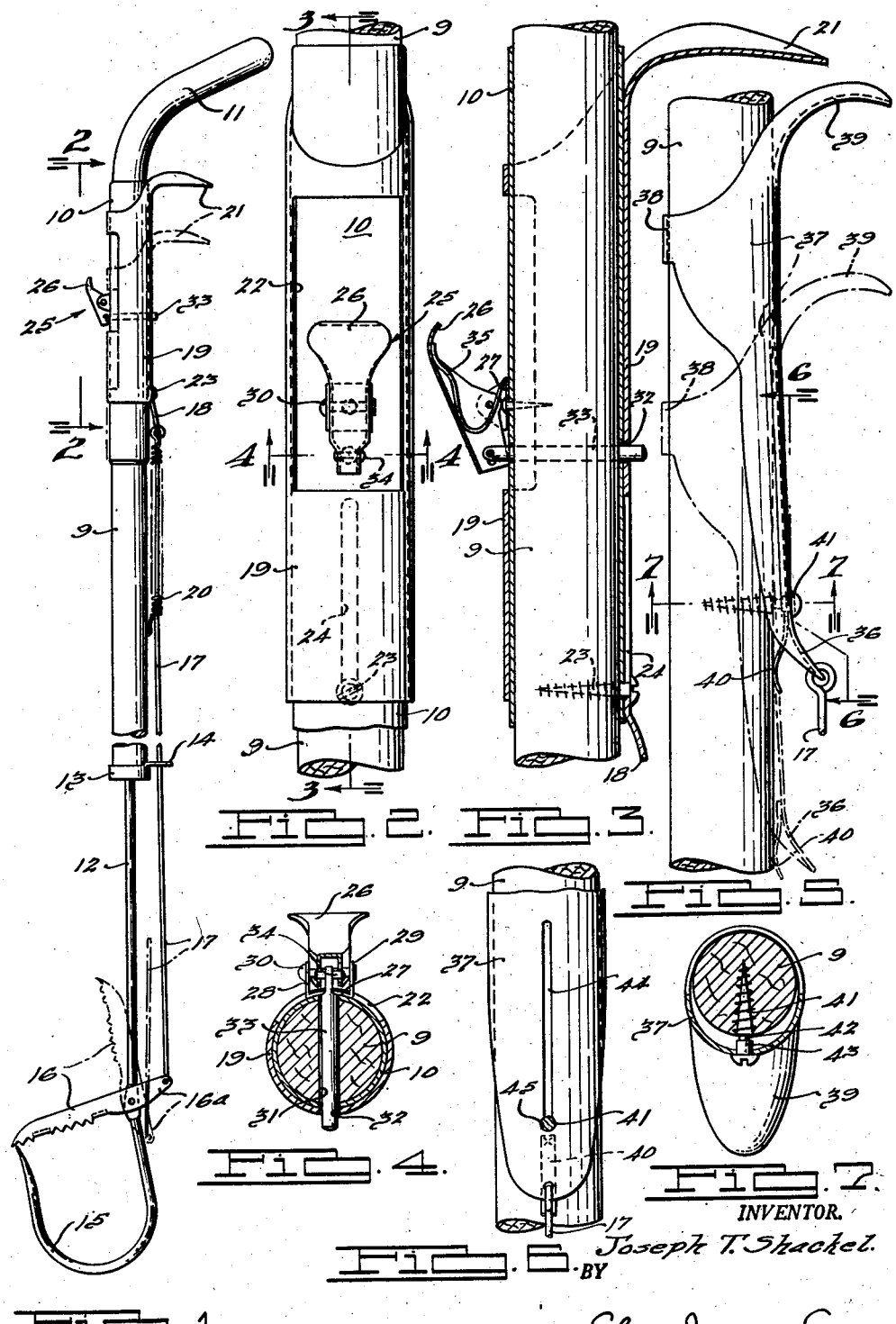

2,584,371

UNITED STATES PATENT OFFICE 2,584,371

FISHING GAFF

Joseph T. Shackel, Detroit, Mich.

Application March 5, 1947, Serial No. 732,514

4 Claims. (Cl. 294—104)

The present invention relates to an improved fish recovery device, relating more particularly to a gaff or grapple for an angler's use in landing a fish safely and certainly.

Under ordinary circumstances, when a comparatively large fish is brought alongside of an angler, it is not always easy to land, especially when it is drawn up to a boat. The fish is inclined to struggle, often making the use of a landing net impracticable and also endangering the angler since the plug or fish hook may become disengaged or thrown about so that one may be injured by it. Also, the line may be too small or too weak to permit the fish to be lifted into the boat safely. Accordingly, a gaff or grapple has been employed heretofore to facilitate making the catch and, in fact, is often essential. In most instances, however, such devices have been ineffective, resulting in the unnecessary loss of a partially made catch.

Accordingly, it is a principal object of the present invention to provide a gaff or grapple having a movable guard member or locking arm which may be operated by the angler to close the hooked end of the device after the fish has been gaffed for preventing the fish from shaking loose or otherwise escaping and preventing accidental or inadvertent dislodging of the fish from the gaff.

It is another object of the invention to provide a self-locking gaff which is under control of the angler at all times, which is light in weight and, therefore, easy to carry and handle, and which is convenient and easy to operate and use. If desired, a gaff constructed in accordance with my invention may be actuated by one hand, thus freeing the fisherman's other hand for taking care of the pole or line.

Still another object of my invention is to provide a device of the foregoing character which is reliable in its operation and which ensures successful landing of the catch once the fish has been engaged by the hook; and to provide a comparatively simple gaff which is economical to manufacture and durable in use.

Other objects and advantages of the invention are in part obvious and will in part appear from a consideration of the following specification and appended claims, reference being had to the accompanying drawings wherein like reference characters designate corresponding parts throughout the several views.

Fig. 1 is a fragmentary side elevation of a gaff or grapple constructed in accordance with the present invention. The guard member and its associated parts are shown in solid lines when in their closed or latched positions and in dotted lines when in their opened or unlatched positions.

Fig. 2 is an enlarged partial left end elevation of the form of the invention illustrated in Fig. 1 and is taken along the line 2—2 of Fig. 1 in the direction of the arrows.

Fig. 3 is a vertical sectional view of the form of the invention illustrated in Figs. 1 and 2 and is taken along the line 3—3 of Fig. 2 in the direction of the arrows.

Fig. 4 is a cross-sectional view of the form of the invention mentioned and is taken along the line 4—4 of Fig. 2 in the direction of the arrows.

Fig. 5 is a fragmentary side elevation of a modification of the invention, the parts illustrated being shown in solid lines when in their closed or latched positions and in dotted lines when in their opened or unlatched positions.

Fig. 6 is a partial right end elevation of the form of the invention illustrated in Fig. 5 and is taken along the line 6—6 of Fig. 5 in the direction of the arrows.

Fig. 7 is a cross-sectional view of the modification of the invention illustrated in Figs. 5 and 6 and is taken along the line 7—7 of Fig. 5 in the direction of the arrows.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Figs. 1 to 4 of the drawings, there is illustrated a gaff or grapple embodying one form of the present invention. The reference numeral 9 designates a staff which extends throughout most of the length of the device and serves as a reach member for enabling the fisherman to gaff the fish. This staff is conveniently dimensioned and is preferably formed from a light material such as wood or aluminum. A portion of the length of the staff 9 near its upper end is preferably enclosed by a sheath 10 for providing a surface over which the sleeve 19 may slide. However, the sheath 10 may be dispensed with if it is considered unnecessary. The staff 9 terminates at its upper end in an angled handle portion 11 which is shaped to provide a so-called pistol grip for more convenient handling of the gaff.

The reference numeral 12 designates a shank which is attached to or forms a part of the gaff hook 15. The shank 12 is attached, at its upper end, to the staff 9 by suitable means, and a ferrule 13 is provided to assist in attaching the shank in place and, of course, to protect the staff at the connection. The ferrule 13 possesses a laterally-extending projection 14 which is slotted for receiving the rod 17 in order to support and guide the latter during the operation of the gaff.

The gaff hook 15 possesses a sharp or pointed end adapted to spear or impale a fish, and it is shaped to hold the fish, in so far as possible, once it has been speared or impaled. To make it more certain that the fish cannot escape from the gaff, a guard member or locking arm 16 is pivoted to the shank of the hook 15. In Fig. 1, this locking arm is shown in its closed position (solid lines) in which it extends from the shank of the gaff hook to the sharpened point thereof and fits over the latter, thereby serving as a closure for the entrance to the hook itself. Thus, once a fish is lodged upon the hook, it cannot shake loose or escape therefrom. The guard member 16 may be opened and closed at will by the angler in the manner explained in succeeding passages hereof. It will be noted that the guard member 16 possesses a serrated edge facing the gaff hook for assisting in holding the fish upon the gaff.

The guard member 16 is connected to its operating mechanism by means of the rod 17 which is pivotally attached to the projecting end 16a of the guard member 16. The rod 17 passes through a suitable opening in the extension 14 attached to the ferrule 13 and is adapted to be moved longitudinally for swinging the guard member 16 into its opened or closed position, as desired. The rod 17 extends along the length of the gaff, finally terminating in an eye which is fitted within the downwardly projecting tongue 18 forming a part of the sliding sleeve 19. A coil spring 20 is attached at its upper end to the rod 17 and is anchored at its lower end to a suitable fastening element affixed to the staff 9. The spring 20 is tensioned or loaded when the sleeve 19 moves upwardly relative to the staff 9; that is, in the direction of the angled handle 11; and this spring is adapted to return the sleeve 19 and rod 17 to their lowered positions when the latching mechanism 25 is operated to unlatch the sleeve 19 for permitting it to move relative to the staff 9.

The sleeve 19 is constructed and dimensioned to enclose the staff 9 or the sheath 10 carried by the staff. It is fitted for sliding movement with respect to the staff and is intended to slide up or down in a longitudinal direction. To assist in holding the sleeve 19 in place and to prevent it from undesirable twisting or rotation, a screw or other fastening element 23 is employed. The screw 23 is attached to the staff 9, a slot 24 in the sleeve 19 being provided to permit the sleeve to slide up and down along the staff relative to the screw 23 while preventing the sleeve from rotating. The sleeve 19 is provided at its upper end with a laterally extending flange 21 which is suitably bent or curved so as to operate as a finger piece. In other words, the handle 11 may be grasped with the index finger placed around the finger piece 21 for pulling the sleeve 19 upwardly on the staff 9 and, as a consequence, operating the gaff to bring the guard member 16 into its closed position as explained more fully hereinafter.

The sleeve 19 is also provided with a cut out portion 22 which, in effect, is a comparatively long and wide slot exposing a portion of the sheath 10. Within the cut out portion 22, there is disposed latching mechanism for locking and unlocking the sleeve 19. This latching mechanism is indicated generally at 25 and includes an operating lever or thumb piece 26. The thumb piece 26 is pivotally attached to a fixed supporting bracket 27 having a pair of laterally spaced upstanding arms 28 and 29. As illustrated in particular in Fig. 4, the thumb piece 26 possesses a chanel-shaped central portion, the depending sides of which lie adjacent to the arms 28 and 29 and a suitable pivot pin 30 passes through these adjacent members to provide the pivotal connection between the thumb piece and the bracket 27.

The reference numeral 31 designates a laterally extending bore in the handle 9, which bore continues through the sheath 10 in the manner illustrated in Fig. 4. The sleeve 19 is provided with a hole 32 which may be brought into registry with the bore 31 when the sleeve 19 is in its uppermost position on the staff 9, so as to provide a continuous lateral passage extending throughout the width of the staff 9 and its associated parts. A latch pin 33 is adapted to fill this passage, thus projecting through the hole 32 and locking the sleeve 19 to the staff 9. However, the latch pin 33 may be retracted to free the sleeve 19 for movement on the staff and, in this connection, the latch pin is pivotally attached to the forward end of the thumb piece 26, preferably at the reduced end of the latter. A conventional pivot pin, such as the rivet 34, may be utilized to provide the pivotal connection between the latch pin and the thumb piece. Preferably, the walls of the thumb piece through which the rivet 34 passes are slotted somewhat to permit some play or longitudinal motion for the latch pin 33 which assists in making it readily operable (see Fig. 3). A leaf spring 35 fits beneath the thumb piece 26 and is bent about to be anchored against the bracket 27 in the manner clearly illustrated in Fig. 3. This spring 35 is adapted to be tensioned or loaded when the thumb piece 26 is depressed for retracting the latch pin 33, that is, for moving it to the left, when the device is positioned as shown in Figs. 1 and 3.

The operation of the gaff or grapple discussed above is convenient and simple. In order to employ the device for assisting in landing a fish, it is evident that the guard member or locking arm 16 must be in its opened or raised position, that is, the position in which it is shown in dotted lines in Fig. 1. To so place the guard member the thumb piece 26 is depressed by the angler, thereby moving the latch pin 33 out of the hole 32 in the sleeve 19. When the latch pin has cleared the hole 32, the sleeve 19 is free to slide relative to the sheath 10 and staff 9. Accordingly, the spring 20, which is under tension, contracts to draw the sleeve 19 downwardly, thereby moving the rod 17 downwardly and swinging the locking arm 16 into its opened position. The slot 24 may serve as a stop since its upper end may contact the fixed screw 23 when the sleeve 19 has moved into its fully lowered position.

With the locking arm in its opened position, the gaff may be used in a conventional manner by the fisherman for impaling the fish. Finally, the angler will maneuver the fish and manipulate the gaff so that the fish is lodged upon the gaff hook 15 and is ready for landing. At this point, the guard member or locking arm 16 is moved into its closed position to prevent the fish from escaping from the gaff hook. The locking arm may be closed by the simple expedient of raising the sleeve 19 upwardly, that is, sliding it along the staff 9 toward the handle 11. Such sliding movement of the sleeve 19 with respect to the staff will, of course, move the rod 17 upwardly, tensioning the spring 20 and swinging the locking arm or guard member 16 into its closed position. When the sleeve 19 has moved relative to the staff 9 far enough to register the opening 32 in the sleeve 19 with the lateral passage 31 in the staff 9 and sheath 10, the latch pin 33 automatically springs into the registered openings 31 and 32, thereby locking the sleeve 19 in its raised position and holding the guard member 16 in its closed position. The latch pin 33 is urged by the spring 35 to move into its locking position.

It is apparent by virtue of the present construction that the guard member 16 not only serves to close the hook end of the gaff to prevent the escape of a fish thereon, but equally important it affords a protective or safety means to prevent accidental injury to persons or property by the sharp point of the hook when the latter is not in actual use in a gaffing operation. In addition, the guard 16 may be locked in the cover position over the hook 15 to permit portage of the gaff in safety and to prevent careless or excited fishermen from accidentally stepping on or running into the point, as for example while the gaff is lying in a fishing boat or on a wharf between uses. The latching mechanism will of course also automatically latch the guard 16 in the cover position over the hook after a fish has been impaled on the latter, so as to secure the catch with a minimum of effort or skill on the part of the fisherman.

The sleeve 19 may be moved relative to the handle 9 for closing the guard member 16 in any suitable manner, although two ways appear to be the most convenient. The angler may so grasp the handle 11 as to place his index finger under the finger piece 21 and pull it toward the handle 11 while holding the handle comparatively tightly, thus moving the finger piece 21 and sleeve 19 upwardly along the staff 9 for operating the device. This means of actuating the mechanism may be accomplished with one hand quite easily, especially if the handle 11 is angled to provide a convenient pistol grasp. Another easy means for closing the guard involves maintaining a firm grip upon the finger piece 21 as by hooking one's index finger about it or holding it with two or more digits and lightly holding the handle 11 or not holding the latter at all if, under the circumstances, one can do so without dropping or losing the gaff. By this means, the weight of the fish on the gaff hook 15 or the pull thereupon resulting from the action of the fish will move the staff 9 downwardly relative to the sleeve 19, which in effect moves the sleeve 19 upwardly with respect to the staff. Thus, the relative movement between the sleeve 19 and the staff 9 results in registering the hole 32 in the sleeve with the passage 31 in the staff to permit the latch pin 33 to lock the parts of the device in their closed position, as explained above.

In Figs. 5 to 7 inclusive, there is illustrated a modification of the present invention. This modification is identical in structure with the form of the invention explained in detail above with the exception of the operating means for the guard member 16. Accordingly, both modifications illustrated are provided with a staff 9, a gaff hook 15 including its shank 12, a pivoted guard member or locking arm 16, and an operating rod 17 for the guard member. Figs. 5 to 7 inclusive do not show all of these elements, since they are clearly illustrated in Fig. 1. However, a part of the staff 9 is shown in Figs. 5 and 6 as well as the uppermost end of the rod 17.

The end of the rod 17 is provided with an eye which is fitted within an opening in the outwardly turned lower end 36 of the sliding member 37. This sliding member 37 functions in a manner comparable to the sleeve 19 of the form of the invention described hereinbefore, that is, it is adapted to slide upwardly relative to the staff 9 for moving the rod 17 with it which, in turn, swings the guard member 16 into its closed position. The slide 37 may be moved downwardly for swinging the guard member into its opened position. The sliding member 37 is provided with a bridging portion 38 which is the only part of the member which encloses the staff 9, the remaining parts of the sliding member fitting about two sides and an end of the staff 9 in the manner illustrated in Fig. 5. Accordingly, the sliding member 37 is adapted not only to move up and down along the staff 9, but, to a limited extent, it may be rocked to move laterally toward and away from the staff for the purpose of locking and unlocking the operating mechanism in the manner explained hereinafter.

The sliding member 37 is provided at its upper end with an extending flange 39 which is suitably curved or bent to operate as a finger piece comparable to the finger piece 21 mentioned hereinbefore. The sliding member 37 is also provided with a leaf spring 40 which is secured to its under side and presses against the outer surface of the staff 9. The spring 40 is so shaped that it is tensioned when the sliding member 37 is moved toward the staff 9. Thus, it urges the sliding member away from the staff and is adapted to slide along the staff when the sliding member 37 is moved with respect thereto. The reference numeral 41 designates a screw fixedly secured to the staff 9, as particularly shown in Fig. 7. The screw 41 is provided with an undercut 42 lying closely adjacent to the surface of the staff 9 and also possesses a generally cylindrical shank 43 extending laterally from the shank 9 beyond the undercut.

The operation of the modification of the invention illustrated in Figs. 5 to 7 inclusive is simple and is quite similar to the operation of the other modification of the invention explained in detail hereinbefore. As pointed out, the sliding member 36 is moved upwardly with respect to the staff 9 to move the rod 17 upwardly and swing the guard member 16 into its closed position, that is, into the position in which it extends from the shank of the gaff hook 15 to the point thereof as shown in solid lines in Fig. 1. When moved upwardly, the sliding member 37 will not only move with respect to the gaff 9, but with respect to the fixed screw 41; for the sliding member is provided with a suitably disposed slot 44 (Fig. 6) permitting it to move with respect to the screw 41. When the sliding member 37 is moved with respect to the staff 9, it will be noted that it is pushed down against the staff so that the slot 44 rides in the undercut 42 (dotted lines, Fig. 5), and the undercut and slot are dimensioned to permit the sliding member 37 to so move when, and only when, the slot 44 is disposed within the undercut 42. When in this position, the sliding member 37 keeps the spring 40 under tension, thus being pressed against the outer walls of the undercut 42. When the sliding member 37 reaches its uppermost position, that is, when the guard 16 has reached its closed position, the comparatively enlarged round opening 45 (Fig. 6) at the lower end of the slot 44 is brought into registry with the screw 41. When this occurs, the tensioned spring 40 pushes the sliding member 37 outwardly away from the staff 9 and, since the opening 45 lies directly beneath the shank 43 of the screw 41, the sliding member 37 may move outwardly until it contacts the head of the screw 41. Thus, the shank 43 fills the opening 45 in the manner clearly illustrated in Fig. 7, and because the shank fits within the opening 45, it is evident that under these circumstances the sliding member 37 is prevented from moving longitudinally relative to the staff 9. Therefore, the sliding member 37 and the rod 17 attached thereto are locked in place for holding the guard member 16 in its closed position.

When it is desired to open the guard member, the end 36 of the sliding member 37 or some nearby portion thereof is depressed, that is, is moved toward the staff 9, flattening the spring 40 as it does so. This movement of the sliding member 37 will move the opening 45 away from the shank 43 and toward the undercut 42. When the sliding member 37 has been pushed toward the staff 9 to lie substantially thereagainst, the slot 44 will have been brought into registry with the undercut 42, thus permitting the sliding member to move downwardly along the staff 9 for moving the guard member to its opened position. It will be noted that in the modification of the invention shown in Figs. 5 to 7 inclusive, there is no spring comparable to the spring 20 for automatically moving the guard member into its opened position once the operating mechanism has been unlatched or unlocked. While such a spring could be added to the presently discussed modification if desired, I have preferred to keep this modification as simple as practicable.

In view of the foregoing explanation, it will be readily understood that I have provided an improved gaff for an angler's use in landing a fish safely and certainly. The gaff may be operated conveniently, if desired by one hand, to close a locking arm or guard member over the gaff hook, thereby preventing the fish from escaping or being dislodged inadvertently. The device is practical, reliable in operation, and prevents unnecessary loss of a partially made catch which is so exasperating to an angler and which has often occurred heretofore.

I claim:

1. In a gaffing device, a handle shaft, a hand grip portion at one end of the shaft, a gaff hook at the other end of the shaft, a guard for the pointed portions of said hook comprising a swinging arm pivotally mounted on the shaft for swinging between an open position to bare the hook for operation and a cover position, one end of said arm being adapted to engage said pointed portions of the hook in overlying relation in the cover position, manually controlled guard operating means having a portion slidable along said shaft and a finger grip portion adjacent said hand grip portion, said guard operating means being operatively connected with the guard for swinging the latter forceably to the cover position when the finger grip portion is drawn forceably toward the hand grip portion, spring means yieldingly urging the guard to the open position, said shaft having a solid body portion, detent means for locking the guard in the cover position including a pin slidably supported within said body portion for sliding transversely of the shaft and having an end adapted to project from the shaft, and spring means yieldingly urging the pin in the direction of said last named end, said guard operating means having a recess therein adapted to register with said end of the pin to receive the latter in locking engagement at the cover position of the guard.

2. In a gaffing device, a handle shaft having a transverse pin hole extending therethrough, a hand grip portion at one end of the shaft adapted to be grasped by one hand of an operator, a gaff hook at the other end of the shaft, a guard for the pointed portions of said hook comprising a swinging arm pivotally mounted on the shaft for swinging between an open position to bare the hook for operation and a cover position, one end of said arm being adapted to engage said pointed portions of the hook in overlying relation in the cover position, manually controlled guard operating means for swinging the guard between said open and cover positions, said guard operating means including a portion slidable longitudinally of said shaft in guided relation and a finger grip portion adjacent said hand grip portion for operative engagement by fingers of said hand and being operatively connected with the guard for swinging the latter forceably to the cover position when the finger grip portion is drawn forceably toward the hand grip portion, spring means yieldingly urging the guard to the open position, detent means for locking the guard operating means in the cover position of the guard including a pin slidably supported within said transverse pin hole and having an end adapted to project from the shaft, detent spring means yieldingly urging the pin in the direction of said last named end, said guard operating means having a recess therein adapted to register with and receive said end of the pin in detent engagement at the cover position of the guard, and means operatively engaged with said pin for withdrawing the latter from the detent position against the tension of the detent spring means including a thumb operated lever mounted on the shaft adjacent said hand grip portion for operation by the thumb of said hand.

3. In a gaffing device comprising a handle shaft having a gaff hook at one end and a hand grip portion at the other end, a swinging guard pivoted on the shaft to swing to and from a cover position overlying the pointed portion of said hook, finger operated means slidable along the shaft and having a finger grip portion adjacent said hand grip portion for operation by a finger of a hand gripping the hand grip portion, means connecting the finger operated means with the guard for swinging the latter forceably to the cover position when said finger grip portion is drawn forceably toward the hand grip portion to a locking position, means yieldingly urging the guard from cover position, and detent means engageable with the shaft and finger operated means to lock the latter in said locking position against slidable movement.

4. In a gaffing device comprising a handle shaft member having a gaff hook at one end and a hand grip portion at the other end, a swinging guard pivoted on the shaft member to swing to and from a cover position overlying the pointed portion of said hook, a finger operated member slidable along the shaft member and having a finger grip portion adjacent said hand grip portion for operation by a finger of a hand gripping the hand grip portion, means connecting the finger operated member with the guard for swinging the latter forceably to the cover position when said finger grip portion is drawn forceably toward the hand grip portion to a locking position, means yieldingly urging the guard from cover position, spring pressed detent means carried by one of said members and cooperable in a detent position with the other member to lock the members against relative sliding movement when the finger operated member is in said locking position, and thumb operated means adjacent said hand grip portion to be actuated by the thumb of the hand gripping said hand grip portion and operative to release said detent means from detent position.

JOSEPH T. SHACKEL.

REFERENCES CITED

The following references are of record in the file of this patent:

UNITED STATES PATENTS

| Number | Name | Date |
|---|---|---|
| 481,463 | Benson | Aug. 23, 1892 |
| 949,750 | Bettis | Feb. 22, 1910 |
| 1,224,571 | Schaier | May 1, 1917 |
| 1,934,801 | Hiner | Nov. 14, 1933 |
| 2,210,169 | Harter | Aug. 6, 1940 |

FOREIGN PATENTS

| Number | Country | Date |
|---|---|---|
| 5,347 | Great Britain | of 1884 |
| 5,491 | Great Britain | of 1891 |
| 21,014 | Great Britain | of 1909 |